United States Patent [19]

von Tomkewitsch

[11] 4,357,593

[45] Nov. 2, 1982

[54] GUIDANCE SYSTEM FOR INDIVIDUAL TRAFFIC

[75] Inventor: Romuald von Tomkewitsch, Ebenhausen, Fed. Rep. of Germany

[73] Assignee: Siemens Aktiengesellschaft, Berlin & Munich, Fed. Rep. of Germany

[21] Appl. No.: 175,657

[22] Filed: Aug. 6, 1980

[30] Foreign Application Priority Data

Sep. 6, 1979 [DE] Fed. Rep. of Germany ....... 2936062

[51] Int. Cl.$^3$ ............................................. G06F 15/50

[52] U.S. Cl. ...................................... 340/23; 340/24; 364/436

[58] Field of Search .................... 340/23, 24; 364/436, 364/444, 424

[56] References Cited

U.S. PATENT DOCUMENTS 3,715,572 2/1973 Bennett ................................ 340/23
3,899,671 8/1975 Stover ................................ 364/436
3,925,641 12/1975 Kashio ............................... 364/436
3,984,806 10/1976 Tyler .................................... 340/23
4,242,731 12/1980 Mizote ................................ 340/24

FOREIGN PATENT DOCUMENTS 2727311 12/1978 Fed. Rep. of Germany ........ 340/23
2812290 10/1979 Fed. Rep. of Germany ........ 340/24
1279227 6/1972 United Kingdom .

*Primary Examiner*—Gerald L. Brigance
*Attorney, Agent, or Firm*—Hill, Van Santen, Steadman, Chiara & Simpson

[57] ABSTRACT

Guidance recommendations are cyclically emitted by stationary beacons (transmitters) to all passing vehicles. In the vehicle, the information belonging to the vehicle's travel destination are selected from the totality of the guidance recommendations. This selection occurs with the assistance of the coordinates of a selection network which exhibits selection fields arranged in concentric rings. The side lengths of the selection fields increase exponentially outwardly of the network mid-point. The guidance beacon, as well as each vehicle which passes the guidance beacon, are situated in the mid-point of the selection network. Thus, the coordinate system of the guidance beacon also applies to the travel destination selected in the vehicle.

12 Claims, 11 Drawing Figures

B0 : 8 Byte
SYN
R
OFB
BAK
X : 20 bit; Y : 20 bit
ZYB

LV : 3 Byte
SEL z.B. B1, B2
SYN
R
M)
OFB
(R)
(SEL)
AUF
LV1
LV2
SEL1
SZ
AZ
SEL2 z.B. B3, B4
SYN
R
OFB
(R)
(SEL)
SEL
SEL
SEL
ZYB

GUIDANCE SYSTEM FOR INDIVIDUAL TRAFFIC

BACKGROUND OF THE INVENTION

1. Field of the Invention

The invention relates to a guidance system for individual traffic in a road system having stationary guide beacons arranged at the roads, the guide beacons cyclically transmitting guidance information for reaching the destinations selectable from its location to all passing vehicles, whereby a specific destination is respectively selectable in the individual vehicles and the guidance information allocated to the selected destination can be selected from the totality of the guidance information transmitted by a guide beacon.

2. Description of the Prior Art

A method for information transmission corresponding to such a guidance system is already known (German AS No. 19 51 992). In contrast to other known systems, this method has the advantage that only stationary transmission devices are required along the travel paths and only receiving devices are required in the vehicles. This method, however, has the disadvantage that it requires relatively complicated devices and procedures for the assignment of the destination selected in the vehicle to specific guidance information from the totality of the information transmitted. This is due to the fact that the destinations are selected according to an absolute coding and that the guidance information belonging to each destination must likewise be transmitted in this absolute coding. If, in the destination guidance system, one wishes to provide a very precise destination indication, then separate information must be respectively transmitted given this absolute coding for a corresponding number of destinations.

SUMMARY OF THE INVENTION

Given a guidance system of the type initially mentioned, the object of the invention is to simplify the information transmission and the selection of the destination information in the individual vehicle in such manner that, given the finest possible destination subdivision, the transmission of as small as possible an amount of information from each guide beacon suffices in order to comprehensively inform the driver for his specific desired destination.

This object is achieved according to the invention, in that the guidance information are transmittable from each guide beacon arranged according to selection fields, whereby each selection field represents a specific region of a selection network at whose midpoint the appertaining guide beacon is located, and whereby the size of the individual selection fields increases exponentially with increasing distance from the midpoint. Moreover, the destinations selectable in the vehicle are likewise assigned to a respective, specific selection field of a selection network stored according to fixed coordinates and coinciding in size and structure with the selection network of the guide beacons, whereby the midpoint of the vehicle selection network is the respective current location of the vehicle. Upon passing a guide beacon, the selection of the guidance information can be carried out in accordance with the destination selection field coinciding at this moment both in the vehicle selection network and in the guide beacon selection network.

The invention begins from the perception that a differentiated destination guidance is required for the travel destinations in the close range of a guide beacon than in travel destinations which are distant. Accordingly, the selection network, serving as the ordering pattern for the transmission and selection of the guidance recommendations, is not based on an absolute coding but, rather, the selection network is always designed concentrically to the respective guide beacon. The individual selection fields are arranged around this centrum like the meshes of the network, whereby their side lengths increase exponentially from ring to ring toward the outside.

A differentiated destination guidance is possible with the selection network as the ordering pattern. In the closer proximity of a guide beacon, which one could designate as the local range, the meshes or, respectively, selection fields of the selection network are relatively narrow. In the distant range, the selection fields become greater with increasing distance, so that, on the one hand, all possible travel destinations in a larger area, for example in central Europe, can be arranged in a relatively small number of selection fields and, on the other hand, a sufficient discrimination of the travel destinations is possible for the uniform distribution of the traffic flows to the entire road system. Due to the relatively small number of selection fields, the amount of information which must be transmitted by the guide beacon is greatly reduced in contrast to known systems.

Computationally, the selection network is conducted with the vehicle from guide beacon to guide beacon, so that the individual vehicle is always situated in the center of the network. This can occur in that, for example, a microprocessor in the vehicle calculates the relative destination coordinates with respect to the beacon coordinates at each guide beacon and, accordingly, assigns the selected travel destination to a specific selection field. The information which relate to this selection field are then selected from the totality of the guidance information transmitted. Therefore, a simple read-only memory storing the boundary coordinates of the individual selection fields suffices for the vehicle device. At each guide beacon, the device can then calculate, with a relatively simple search program, in which selection field its individual travel destination is to be ordered.

The selection field itself, for example, can be constructed according to the Cartesian coordinate system, so that the individual section fields have a rectangular form. In another advantageous embodiment, a selection network described with polar coordinates can also be employed. Potentially, such a network does greater justice to the desire of the traffic participants to arrive at their travel destination on as directly as possible a path.

The selection of the travel destination in the vehicle can occur in a manner known per se by inputting the destination coordinates from an absolute coordinate system. The conversion into the selection network then occurs, as already described, in accordance with the respective location. For destinations that are frequently targeted, for example for a place of residence, a place of work or the like, destination registers can be provided in the vehicle device. Such stored travel destinations can then be selected by pressing one or two keys.

The transmission of the guidance recommendations from the guide beacons to the individual vehicle occurs with guide beacon messages which are constantly cyclically transmitted. These messages contain the guidance recommendations arranged in data blocks in accordance with the selection network. In the data transmission procedure, it must also be guaranteed that the vehicle device properly interprets the message of the guidance recommendations when the appertaining vehicle enters the transmission range of a guide beacon at any point in time. Since the selection fields are arranged in rings around the midpoint, it is advantageous to transmit the guidance information for a respective ring in a closed block and to initiate each of these blocks by a synchronization character and to terminate each with a safeguarding byte. Depending on the number of rings of the selection network, therefore, the guide beacon message then contains a corresponding number of information blocks. Losses of time due to timing errors are relatively slight in this type of coding, for a vehicle, for example, can receive a random block as the first, whereby the block preceding in the cycle is then received as the last.

In accordance with the differing incidence of guidance information, the individual message blocks can also have differing lengths.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
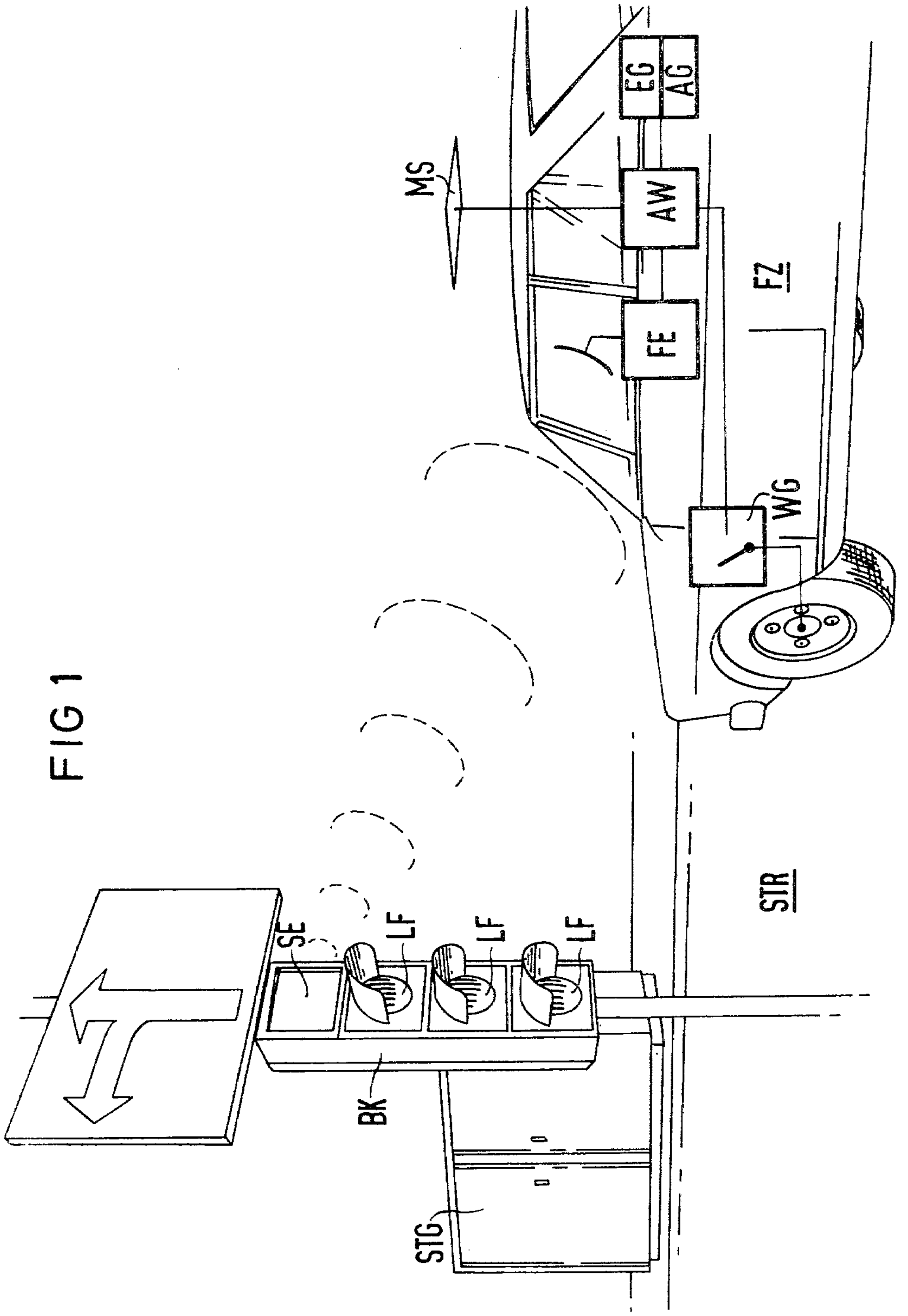
FIG. 1 is a pictorial and schematic representation of the transmission of guidance information from a stationary guide beacon to a vehicle.

In the example of FIG. 1, the possible arrangement of the stationary devices, on the one hand, and of the vehicle borne devices, on the other hand, is illustrated. A vehicle FZ, which is moving along a road STR, receives its guidance information from a stationary transmitter SE in the guide beacon device BK. In the example illustrated, the guide beacon device BK is a traffic signal housing in which the transmitter SE is arranged in addition to the standard signal lights LF. Thus, existing devices and poles can be co-employed for the transmission of the guidance recommendations. For example, the memories and measuring devices belonging to the guide beacon can also be housed in the housing of a traffic signal control device STG which is connected (not shown) to the traffic light structure.

Advantageously, the guide beacon device contains a microwave or infrared transmitter which transmits the guidance information to the vehicle FZ, namely to each passing vehicle FZ. To this end, the vehicle FZ contains a microwave or infrared receiver FE which receives the guidance information from the guide beacon transmitter SE and supplies the same to an evaluation device AW in the vehicle. The evaluation device AW at the same time receives information concerning the length and the direction of the path respectively traversed. To this end, a path pulse generator WG for hodometry and a magnetic field probe MS for measuring the respective travel direction are attached to the vehicle. A microprocessor provided in the evaluation device is programmed to form incremental path vectors from the measured values of the path pulse generator WG and of the magnetic field probe MS and sums these continuously. On the basis of the vehicle position determined in this manner, the location-dependent guidance information can be selected from a larger block and can be displayed at the proper time. To this end, an input device EG and an output device AG are connected to the evaluation device AW. For example, the selected travel destination is input via the input device EG, for example a keyboard. In the evaluation device AW, the information pertaining to the selected travel destination are selected from the sum of the transmitted guidance information and are displayed at the output device AG. To this end, all guidance information are transmitted with an additional location indication, so that, taking the respectively traversed path vector into consideration, they are always displayed precisely when their testimony applies and is to be observed.

Figure 2:
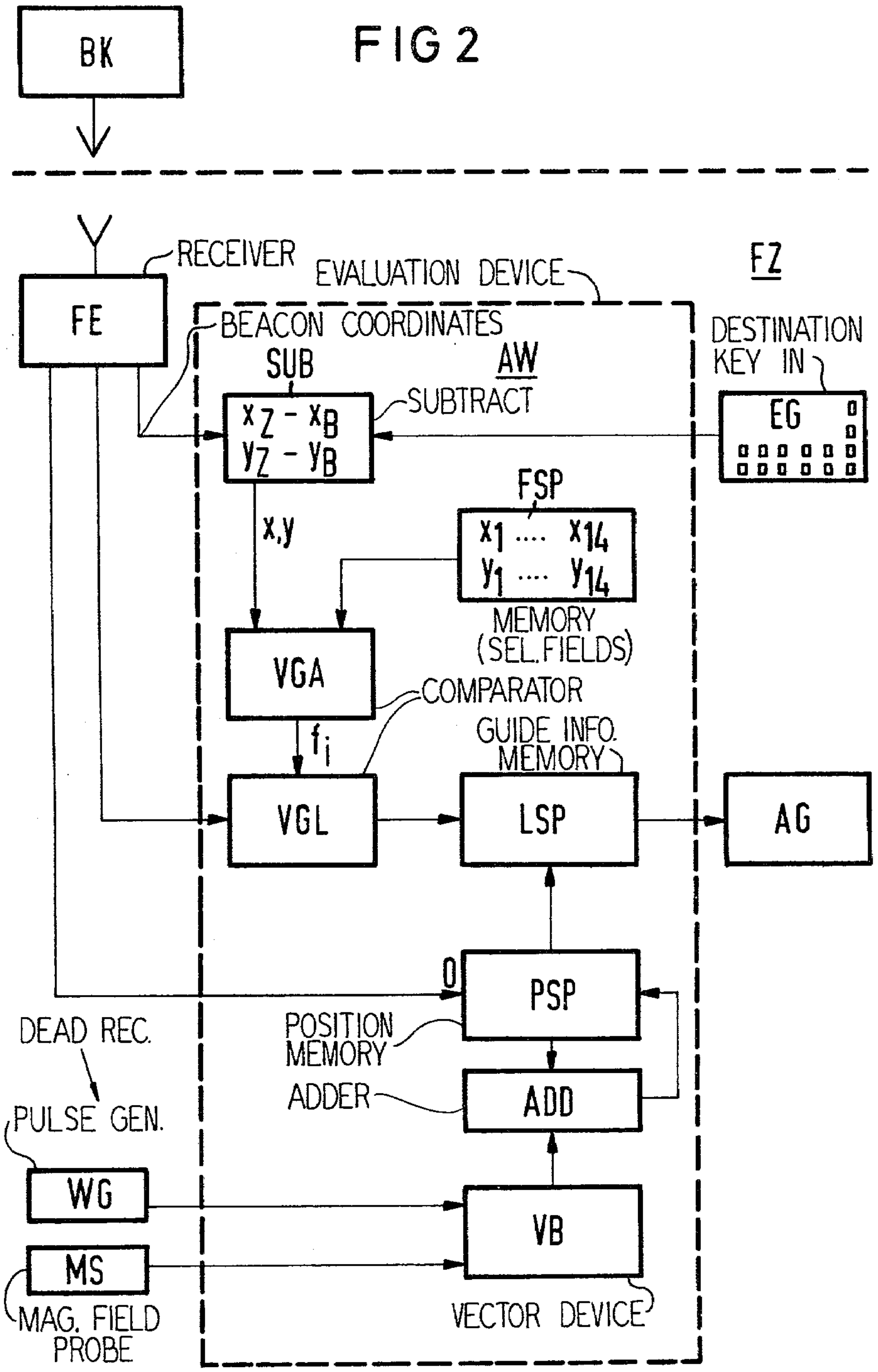
FIG. 2 is a block diagram of the selection device for the guidance information in a vehicle.

The manner of operation of the evaluation device in the vehicle will now be explained below on the basis of the block diagram of FIG. 2. The system has a central station (not illustrated in further detail) which receives traffic information from the entire region which can be covered and works out guidance information from this traffic information for the individual desired destination entering into considertion. For each starting location, i.e., for each location of a guide beacon, there is a specific group of desired destination and correspondingly appertaining guidance information. This group of guidance information is transmitted to the appertaining guidance beacons BK (FIG. 1). In addition, further information can be stored in each beacon device, for example path information independent of traffic conditions, speed regulations and traffic signs and the like.

The guidance information are cyclically transmitted in the form of guidance messages by the transmitter SE of the respective beacon device and are received by the individual vehicles via their vehicle receiver FE. The individual guidance messages first respectively contain an indication concerning the precise location of the beacon device, i.e., the beacon coordinates $x_B$ and $y_B$. These beacon coordinates serve to coordinate the destination coordinates $x_Z$, $y_Z$ input in the evaluation device AW of the vehicle with the guidance information. Moreover, the dead-reckoning device including the path pulse generator WG and the magnetic field probe MS can be corrected with the beacon coordinates; in the present example, it is advantageous to have the dead-reckoning respectively begin anew from the zero point upon passing each guide beacon.

As mentioned above, the coordinates $x_Z$, $y_Z$ of the selected travel destination are input via the input device EG. To this end, advantageously, an absolute coding according to grid squares is undertaken. Thereby, grid squares of 100 m × 100 m ought to be expedient in order to render possible an effective destination guidance, even in cities. In designing a traffic guidance system for a large area such as the central European area, thus, one must proceed to this end from a uniform coordinate network with an extent of approximately 3000 km×3000 km and smaller destination fields of 100 m×100 m. The selected destination can be selected from a map with such grid squares and be input in the form of two five-place numbers for the x and y coordinates. For destinations which are frequently targeted, such as place of residence, place of work and the like, destination registers can be provided in the input device. In this case, the destination input is reduced to pressing one or two keys.

The input destination coordinates $x_Z$, $y_Z$ are stored in the input device EG in a standard manner and are compared with the respective beacon coordinates $x_B$, $y_B$ when passing a guide beacon. The respective relative destination coordinates x, y are formed therefrom in a subtractor SUB by means of difference formations:

$$x = x_Z - x_B$$

$$y = y_Z - y_B.$$

The guidance information are transmitted from each beacon device according to a relative coordinate system, whereby the guide beacon forms the midpoint of this coordinate system. According to the same relative coordinates, the guidance information appertaining to the selected destination can now be selected in the vehicle.

Figure 3:
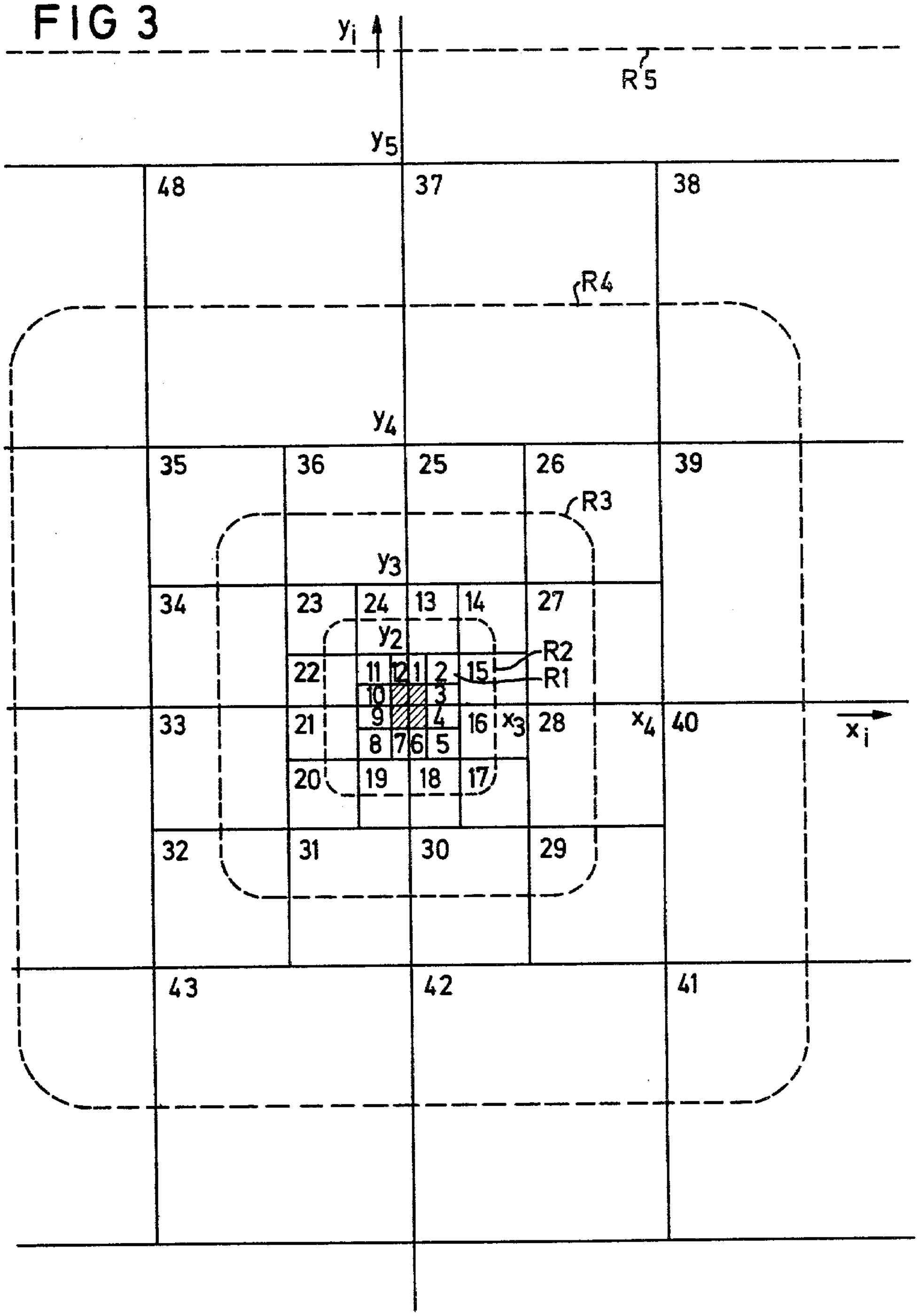
FIG. 3 is a plan view of a selection network for a combination of travel destinations based on Cartesian coordinates.

The full precision of the destination coding is only required in the selection of relevant guidance recommendations when the destination has been nearly reached. At greater distances from the destination, the evaluation device AW need only roughly calculate the direction in order to be able to select relevant guidance recommendations. For selection, therefore, a selection network consisting of individual selection fields is employed, the mesh size of the selection network increasing exponentially with the distance from the center. The pattern of such a selection network is illustrated in FIG. 3. The appertaining guide beacon and the vehicle just passing, as well as receiving the guide recommendations, are respectively situated in the center of the selection network. The selection network according to FIG. 3 is constructed according to Cartesian coordinates. Quadratic or, respectively, rectangular selection fields are arranged concentrically in rings, whereby the mesh widths double from ring to ring. The side lengths ($x_{i+1} - x_i$; $y_{i+1} - y_i$) of these selection fields thus increase exponentially from ring to ring. In this example, each ring consists of twelve selection fields which are continuously numbered. Thus, the selection fields of the first ring R1 have the addresses 1–12, those of the second ring R2 have the addresses 13–24, etc. If one gives the selection fields 2, 5, 8 and 11 of the first ring (around the shaded zero zone) an edge length of 100 m, then the selection network with 14 rings covers a surface of 3277 km×3277 km. Thus, the selection fields 1–12 of the first ring have a side length of 0.1 km, the selection fields 13–24 of the second ring have the side length 0.2 km, and the selection fields 25–36 of the third ring have a side length of 0.4 km, etc.

The numbers of the selection fields serve as addresses for the respective guidance information, namely both in the transmission from the guide beacon to the vehicle and in the selection of the guidance information in the vehicle. The pattern of the selection network is stored in the vehicle in the form of the coordinates $x_1$, $x_2$, $x_3$ . . . $y_1$, $y_2$, $y_3$ . . . for the individual rings in a read-only memory FSP. Therefore, it suffices to respectively store 14 values for x and y in the memory FSP given 14 rings, thus to allocate the selected travel destination to a specific selection field and, thus, to a specific guidance information in a relativey simple manner. To this end, the calculated relative destination coordinates x and y are supplied to a comparator VGA (FIG. 2) and are compared there with the selection network coordinates $x_1$ . . . $x_{14}$, $y_1$ . . . $y_{14}$ from the read-only memory FSP. One gains a selection field address $f_i$ from this comparison which is supplied to a further comparator VGL. The information respectively appertaining to the specific selection field $f_i$ is selected from the total guidance information received in the vehicle receiver FE in this comparator and is stored in the guidance information memory LSP. The guidance information memory LSP, therefore, contains all information which the vehicle driver requires in order to reach the destination or, under certain conditions, the next guide beacon. The output of the respectively location-related guidance information occurs in accordance with the respective position which is taken from a position memory PSP.

The position memory PSP is respectively set to zero when passing a beacon and is kept constantly current proceeding from there with the assistance of the dead-reckoning device. As mentioned above, the traversed travel path is measured with a path pulse generator WG and the direction of travel is measured with a magnetic field probe MS; subsequently, the respective path vector is determined in a vector determining device VB. This path vector is added in an adder ADD to the respective earlier vehicle position from the position memory PSP; the new vehicle position resulting therefrom is again input into the position memory.

Figure 4:
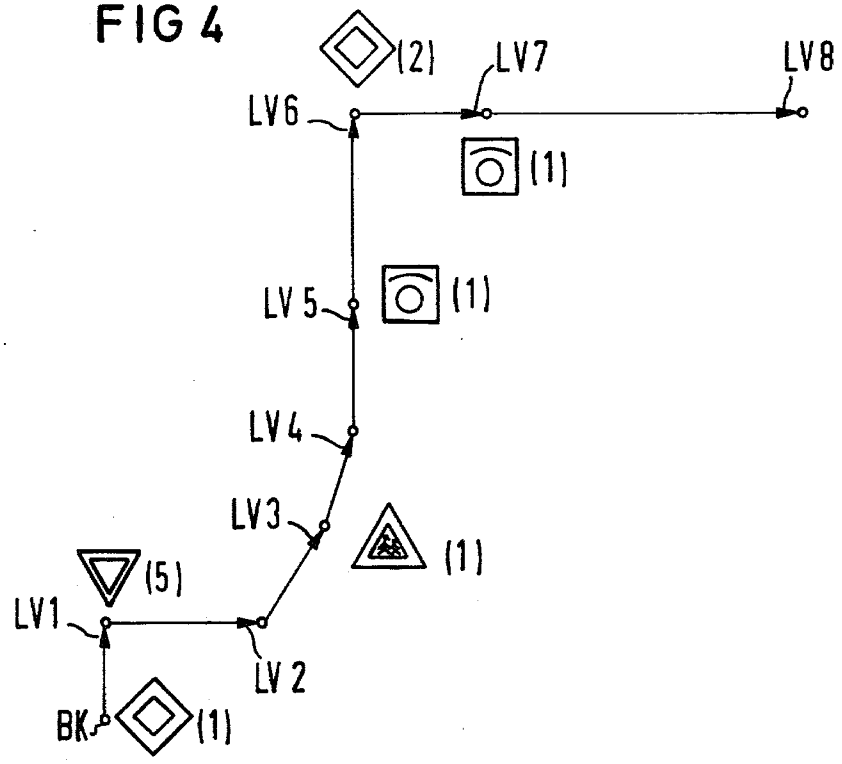
FIG. 4 illustrates a guidance recommendation as a chain of guidance vectors.

The guidance information are advantageously provided as a chain of guidance vectors as is illustrated in FIG. 4. The recommended path, for example, begins at a guide beacon BK or attaches to the last intermediate destination of a guidance recommendation. FIG. 4 now, shows what information, for example, is transmitted for the illustrated path segment and displayed in the vehicle. If the vehicle begins to follow the guidance vector LV1, which is identified in an auto-navigation device AN, then, in the example illustrated, the traffic sign "Arterial Highway" is also displayed. In FIG. 4, the display duration is also indicated as a plurality of guidance vectors in addition to the appertaining character. The traffic sign "Arterial Highway", thus, is displayed for the duration of one guidance vector. While the vehicle is still following the guidance vector LV1, the guidance vector LV2 is calculated from the stored coordinates of its beginning and of its end and is already displayed. Thus, the driver has time to enter the proper lane. At the beginning of the guidance vector LV2, the traffic sign "Pay Attention To Right Of Way" then appears and is displayed for the duration of 5 guidance vectors, i.e. up to the end of guidance vector LV6. Moreover, a travel direction arrow for the guidance vector LV3 is displayed in the display field. The distance up to the intersection at the end of guidance vector LV2 can also be continuously calculated and displayed. Further traffic signs can be transmitted and displayed in the same manner.

Figure 5:
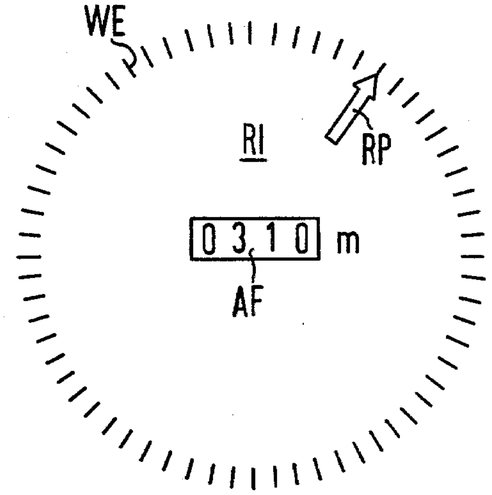
FIG. 5 illustrates a possible display in the vehicle for the recommended travel direction.

A display possibility for the guidance vector is illustrated in FIG. 5. Thereby, it is a matter of a compass instrument RI with an angular division WE, whereby a directional arrow RP describes the respectively recommended direction of travel. In addition, a display field AF for an alphanumerical distance display is provided in the center. Here, one can read from which point the recommended and displayed change of direction applies. In the example of FIG. 5, therefore, it can be read from the display device that a half-turn toward the right is to be made after 310 meters.

Figure 6:
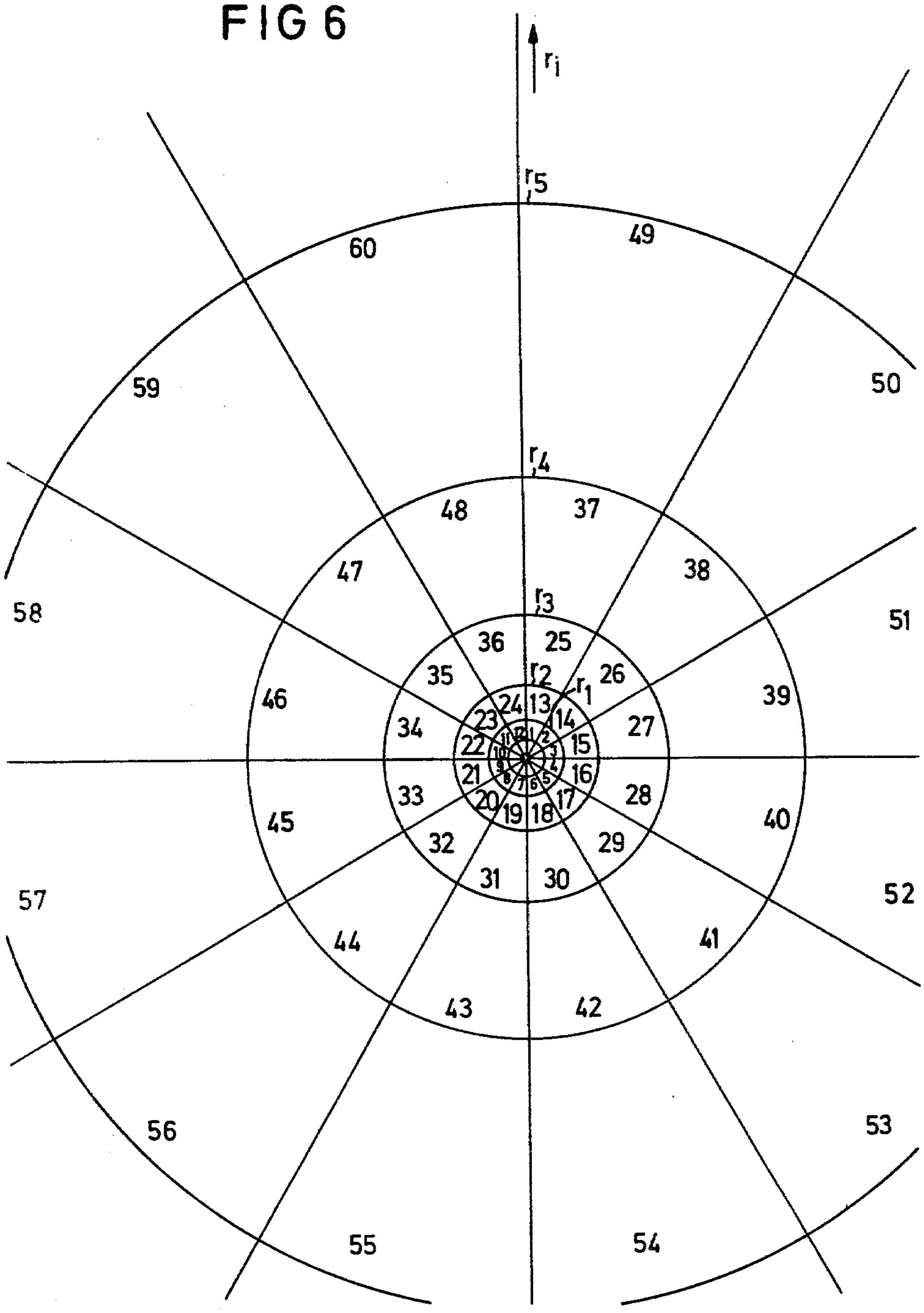
FIG. 6 is a plan view of a selection network for a combination of travel destinations based on polar coordinates.

The preceding description of the selection of relevant guidance recommendations was based on a selection network which, according to FIG. 3, is constructed according to a Cartesian coordinate system. In terms of traffic engineering, however, a selection network described with polar coordinates could also be advantageous. Such a selection network with polar coordinates is illustrated in FIG. 6. As in the selection network according to FIG. 3, the individual selection fields are also numbered consecutively here. The individual rings are now circular; thereby, the radii $r_i$ increase exponentially from the inside toward the outside of the network. With $r_i=0.1+2^i$ km and with $i=0 \ldots 15$, such a selection network covers a circular area with a diameter of 3277 km. Otherwise, the calculation of the destination field and the allocation to the guidance information occurs in accordance with the method described above.

Figure 7:
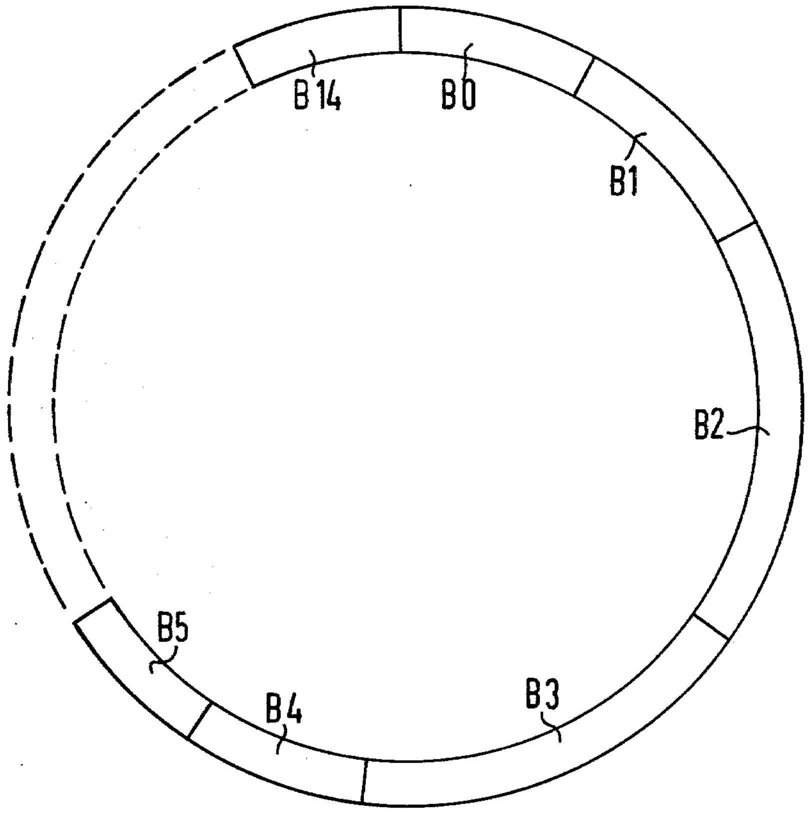
FIG. 7 illustrates the format of a guide beacon message.

The guide beacons transmit their guidance recommendations ordered according to selection fields, namely cyclically beginning with the selection fields of the first ring, then those of the second ring, etc. Given this data transmission procedure, it must be guaranteed that the evaluation device AW correctly interprets the message of the guidance recommendations when the appertaining vehicle enters the transmission range of a guide beacon at any random point in time. For this reason, the guidance beacon messages are subdivided into a plurality of data blocks. Advantageously, these data blocks respectively correspond to one ring of the selection field. FIG. 7 schematically illustrates the format of such a guide beacon message which is cyclically transmitted. Each data block is initiated by a synchronization character and is terminated by a safeguarding byte. The block B0 contains the guide beacon identifier, the blocks B1–B4 contain the guidance recommendations for the selection fields of the corresponding rings R1–R14. Losses of time due to timing errors are relatively slight in this manner of coding for a vehicle can receive, for example, the data block B4 as the first data block and receive the data block B3 as the last, whereas another vehicle which arrives in the transmission range of the guide beacon somewhat later receives the data block B10 as the first and the data block B9 as the last.

Figures 8, 9, 10, 11:
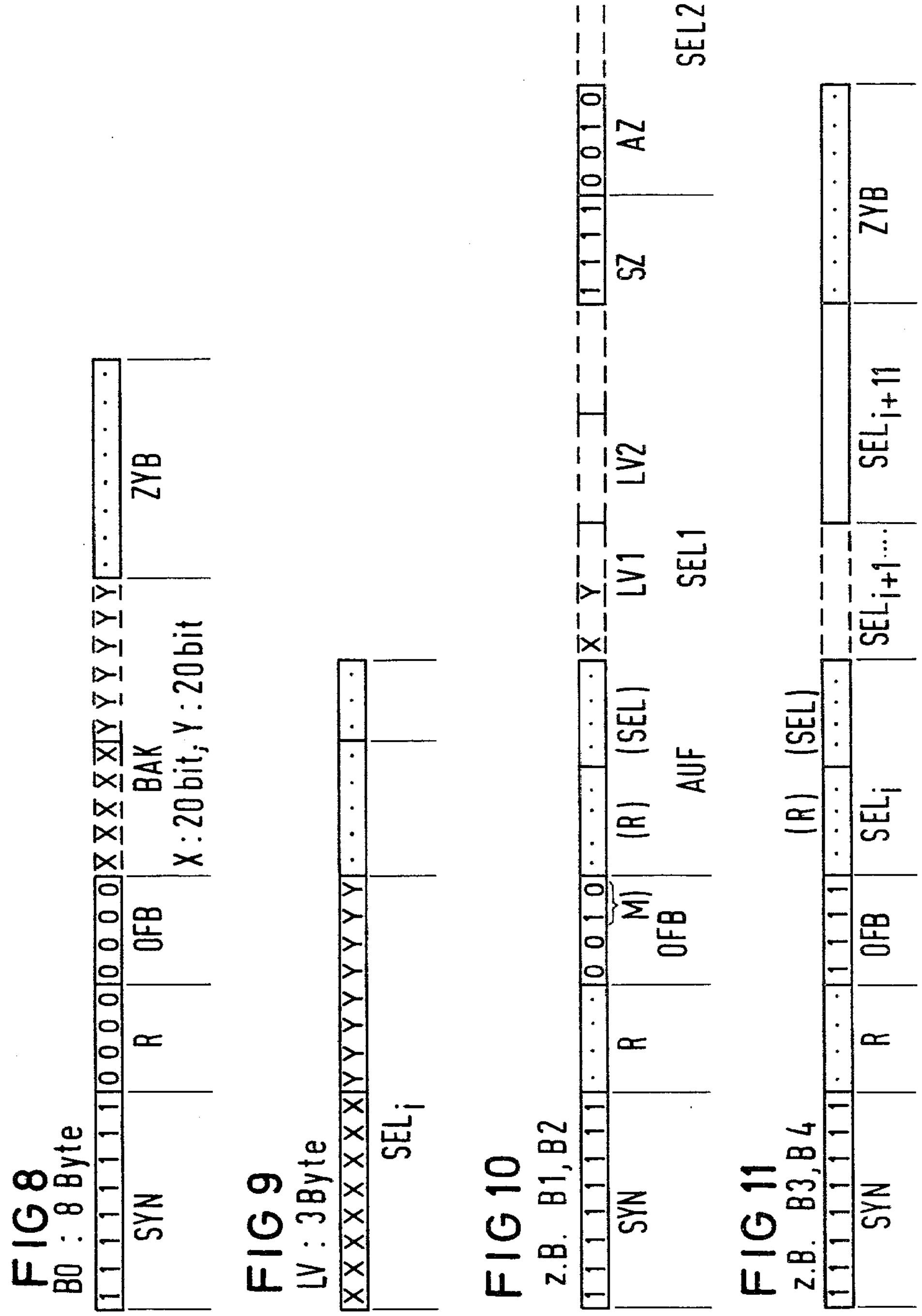
FIGS. 8–11 illustrate examples of coding for the guidance recommendations.

A possible coding for the individual data blocks of the guidance beacon message is illustrated in FIGS. 8–11. FIG. 8 shows the coding of block B0, i.e. the guide beacon identifier. To this end, for example, 8 byte can be employed. The data block B0, like every other data block, begins with a synchronization character SYN with eight bits. Next, there follows the section OFB in which the appertaining ring can be characterized as local or distant range. In the data block B0, only a "0" is here. Following thereupon is a code section BAK for the beacon coordinates. In the example, 20 bits are respectively provided here for the x coordinates and for the y coordinates. The termination of the block B0 is then formed by a cyclical data block safeguard ZYB.

FIG. 10 illustrates a coding for a ring R in the local range, i.e. for one of the inner rings of the selection network. The ring number, for example 1 or 2, is coded after the synchronization character SYN. The number of the rings for the local range, however, is variable from guide beacon to guide beacon. In rural areas, the local range will generally be greater than in inner-city areas with a dense road system and smaller intervals between the guide beacons. Therefore, following the ring number, it is respectively marked as to how the following information are to be interpreted. The next byte in the coding area AUF indicates the starting point or, respectively, the starting field for the chain of guidance vectors. That can either be the ring 0000, i.e. the location of the guide beacon, or the last intermediate destination of a guidance recommendation which has led to a selection field SEL of a ring R lying further toward the inside.

There subsequently follows a variable number of guidance vectors LV1, LV2 . . . , of which each can be coded with three byte. Such a guidance vector coding is illustrated in FIG. 9. Given 8 bit each for the x and y coordinates, one can describe intermediate destinations in an area of 2560 m×2560 m in 10 m units. In city areas, a local region should not exceed these dimensions, but would in suburbs or in rural areas. Therefore, in the area OFB of the guidance recommendation according to FIG. 10, the last two bits can be employed for indicating a scale (indicated with M there). In this manner, one can multiply, for example, the 10 meter units with the factors 1, 2, 5 or 10 and thus obtains a maximum local area of 25.6 km×25.6 km.

The end of the guidance vector chain LV1, LV2 . . . leading to the selection field 1 (SEL 1) of a ring is marked by a clearing signal SZ (FIG. 10). This clearing signal, for example, reads 1111; the address of the next selection field (SEL 2) follows thereon as a starting character AZ. There subsequently again follows the marking of a starting field and the following guidance vectors, etc. The cyclical data block safeguarding ZYB as in FIG. 8 follows behind the clearing signal SZ for the twelfth selection field of a ring.

The guidance recommendations of the rings in the distant range are significantly shorter. An example of this is illustrated in FIG. 11. Only one byte is provided for each selection field $SEL_i$, $SEL_{i+1}$, etc. Thereby, i respectively indicates the first selection field of the appertaining ring, etc. A specific selection field in the local range which is to be approached in order to arrive at the distant destination is respectively coded in this one byte for each selection field. Therefore, a respective ring R and a selection field SEL are programmed as an intermediate destination. The path to these intermediate destinations is to be respectively derived from the corresponding message blocks for the indicated rings R.

The amount of information which will have to be transmitted with a guide beacon message will differ from guide beacon to guide beacon. It depends on the size of the local regions and, thus, on the plurality of guide vectors required. If a guidance recommendation contains many changes of direction or if many traffic signs are pointed out, then many guide vectors are to be transmitted. If, on the other hand, the path to be taken can be simply described, then one only requires a few guide vectors. By means of the structure of the selection network with meshes becoming greater toward the outside, however, it is assured overall that the total required informational amount can be transmitted from the individual beacon to the passing vehicles in the time available.

It will be apparent that many modifications and variations may be effected without departing from the scope of the novel concepts and teachings of the present invention.

I claim:

1. A vehicle guidance system comprising:

a selection network of selection fields including a plurality of beacon devices each of which is located at the midpoint of a respective selection field for transmitting a guidance message including a location message identifying the location of the beacon and guidance information, the guidance information including specific information relating to each of the selection fields for travel to a respective selection field;

in a vehicle a receiver for receiving a guidance message from a beacon as the vehicle passes a respective beacon device;

input means including destination input means for generating destination messages;

output means including indicator means for indicating guidance information in response to guidance signals; and evaluating means connected to said receiver, connected to said input means and connected to said output means, said evaluation means including a subtractor connected to said receiver and connected to said destination input means for forming relative destination coordinates from a location message and a destination message, a selection field memory storing coordinates of the selection fields of the selection network, a first comparator connected to said subtractor and connected to said selection field memory for producing an address of a specific selection field of a destination, a guide information memory connected to said output means, and a second comparator including a first input connected to said first comparator, a second input connected to said receiver and an output connected to said guide information memory, and responsive to said addresses of said specific selection field and the transmitted specific information relating to said specific selection field to store said specific information in said guide information memory.

2. The guidance system of claim 1, wherein the beacon devices transmit Cartesian coordinate location messages, and wherein:

said destination input means includes means for generating Cartesian coordinate destination messages.

3. The guidance system of claim 2, wherein:

said destination input means comprises a keyboard.

4. The guidance system of claim 1, wherein the beacon devices transmit polar coordinate location messages, and wherein:

said destination input means includes means for generating solar coordinate destination messages.

5. The guidance system of claim 4, wherein:

said destination input means comprises a keyboard.

6. The guidance system of claim 1, wherein:

said input means further comprises dead-reckoning input means for generating path of travel signals;

said evaluation means comprises dead-reckoning vector forming means for generating dead-reckoning messages; and guidance information means connected to said dead-reckoning vector forming means and to said receiver for selectively generating guidance signals in response to destination, location and dead-reckoning messages.

7. The guidance system of claim 1, and further comprising:

dead-reckoning means connected to said receiver and to said guide information memory for generating vector travel information in response to receipt of a location message and causing said guide information memory to output specific guidance signals.

8. The guidance system of claim 7, wherein said dead-reckoning means comprises:

a dead-reckoning pulse generator;

a magnetic field probe;

vector means connected to said pulse generator and to said probe for producing vector coordinate data;

a position memory connected to said receiver and to operate said guide information memory and reset to zero in response to passing a beacon and receipt of a guidance message and operable to store the position of the vehicle; and an adder connected between said position memory and said vector means for updating the content of the position memory as the vehicle passes a beacon device.

9. A method for guiding a vehicle through a selection network of selection fields each representing a specific area of the network and each including a guide beacon device at its mid-point, the selection fields being located in rings about the mid-point of the selection network and being of exponentially increasing size with increasing distance from the network mid-point, comprising the steps of:

storing the coordinates of the selection fields in a vehicle;

generating a destination message including the coordinates of the desired destination;

transmitting to the vehicle as it passes a beacon device a guidance message including specific information relating to each of the selection fields for travel to the respective selection field;

receiving the guidance message in the vehicle;

subtracting the destination coordinates from the location coordinates of the beacon being passes to obtain relative destination coordinates of the desired location;

comparing the relative destination coordinates with the stored coordinates of the selection fields to select data identifying a specific selection field;

comparing the specific selection field data with the received guidance message to select all guidance data from the guidance message relating to the specific selection field;

storing the selected guidance data;

producing, upon receipt of a guidance message, dead-reckoning vector data corresponding to the travel of the vehicle; and displaying the guidance data in accordance with the vehicle position corresponding to the dead-reckoning data.

10. The method of claim 9, wherein the step of transmitting a guidance message is further defined as:

cyclically transmitting message blocks including a beacon identifier and guide information for the individual selection fields.

11. The method of claim 10, wherein the step of transmitting a guidance message if further defined as:

transmitting a message block assigned to a ring, including a synchronizing portion at the beginning and a safeguarding portion at the end of a message block.

12. The method of claim 10, wherein the step of transmitting a guidance message is further defined as:

transmitting a message block from the beacon devices in an inner area of said network, said message block including total guidance information when the destination lies in a neighboring selection field; and transmitting a message block from beacon devices, which message block includes less than the total guidance information when the destination lies in one of the outer selection fields of the selection network.

* * * * *